United States Patent
Swanepoel et al.

(10) Patent No.: US 7,676,509 B2
(45) Date of Patent: Mar. 9, 2010

(54) METHODS AND APPARATUS FOR MODIFYING A BACKUP DATA STREAM INCLUDING A SET OF VALIDATION BYTES FOR EACH DATA BLOCK TO BE PROVIDED TO A FIXED POSITION DELTA REDUCTION BACKUP APPLICATION

(75) Inventors: Jacques Diederik Swanepoel, Mississauga (CA); Guangsheng Fu, Mississauga (CA)

(73) Assignee: i365 Inc., Santa Clara, CA (US)

( * ) Notice: Subject to any disclaimer, the term of this patent is extended or adjusted under 35 U.S.C. 154(b) by 190 days.

(21) Appl. No.: 11/345,819

(22) Filed: Feb. 1, 2006

(65) Prior Publication Data

US 2007/0179998 A1    Aug. 2, 2007

(51) Int. Cl.
*G06F 17/30* (2006.01)
(52) U.S. Cl. .................................. 707/204; 711/162
(58) Field of Classification Search ......... 707/200–205, 707/2
See application file for complete search history.

(56) References Cited

U.S. PATENT DOCUMENTS

| | | | | |
|---|---|---|---|---|
| 5,604,487 A * | 2/1997 | Frymier | ...................... | 340/5.9 |
| 5,745,906 A | 4/1998 | Squibb | | |
| 5,752,039 A * | 5/1998 | Tanimura | ..................... | 707/203 |
| 5,765,172 A * | 6/1998 | Fox | .............................. | 707/204 |
| 5,781,911 A * | 7/1998 | Young et al. | ................. | 707/201 |
| 5,990,810 A * | 11/1999 | Williams | ...................... | 341/51 |
| 6,233,589 B1 | 5/2001 | Balcha et al. | | |
| 6,237,068 B1 * | 5/2001 | Cadden et al. | .............. | 711/154 |
| 6,785,786 B1 * | 8/2004 | Gold et al. | .................. | 711/162 |
| 6,968,349 B2 * | 11/2005 | Owen et al. | ................. | 707/204 |
| 2003/0056139 A1 | 3/2003 | Murray et al. | | |
| 2005/0080823 A1 * | 4/2005 | Collins | ....................... | 707/200 |
| 2007/0100913 A1 * | 5/2007 | Sumner et al. | .............. | 707/204 |
| 2007/0136741 A1 * | 6/2007 | Stattenfield | .................. | 725/32 |
| 2007/0288533 A1 * | 12/2007 | Srivastava et al. | ........... | 707/203 |

FOREIGN PATENT DOCUMENTS

WO   WO99/38097   7/1999

OTHER PUBLICATIONS

International Search Report and Written Opinion Of The International Searching Authority dated Aug. 8, 2007, for related PCT Application No. PCT/US2007/002684.

* cited by examiner

*Primary Examiner*—Mohammad Ali
*Assistant Examiner*—Thuy (Tiffany) Bui
(74) *Attorney, Agent, or Firm*—Weaver Austin Villeneuve & Sampson LLP

(57) ABSTRACT

Methods and apparatus for modifying a data stream of backup data to be provided to a fixed position delta reduction backup method are disclosed. When the data stream is received, at least a portion of the data stream is parsed into a plurality of data blocks and a plurality of sets of validation bytes, wherein each of the plurality of data blocks corresponds to one of the plurality of sets of validation bytes. One or more modified data streams are then generated such that the plurality of data blocks are separate from the plurality of sets of validation bytes.

59 Claims, 7 Drawing Sheets

METHODS AND APPARATUS FOR MODIFYING A BACKUP DATA STREAM INCLUDING A SET OF VALIDATION BYTES FOR EACH DATA BLOCK TO BE PROVIDED TO A FIXED POSITION DELTA REDUCTION BACKUP APPLICATION

BACKGROUND OF THE INVENTION

The present invention relates to modifying a backup data stream to be processed by a fixed position delta reduction backup process. More particularly, the present invention relates to modifying a backup data stream to be processed by a fixed position delta reduction backup method, where the backup data stream includes a set of validation bytes for each data block.

In order to backup data, data backups are often performed via what is commonly referred to as a "backup application." During a data backup, the backup application sends the data to be stored either to a local storage medium or via a network interface for remote transmission. The amount of data that is stored by the backup application varies with the method implemented by the backup application. For instance, some backup applications backup all data in the specified directory, database or file, while other applications attempt to increase the efficiency of the backup process by storing only the data that has been modified since the last backup. One commonly used method is the fixed position delta reduction method, which determines which fixed position segments of data have been modified since the last backup and stores the data reflecting those changes. In other words, the fixed position delta reduction method determines which segments of data have been modified by comparing one segment of data at a fixed position in a file or data stream received during a current backup with the segment of data previously at that same fixed position in the file or data stream during the last backup for that particular file.

The process via which a backup application implementing a fixed position delta reduction method executes and the effectiveness of that process varies with the format in which data is stored. Specifically, data associated with a particular file or database may be retrieved in the form of separate physical-organized streams or in a single stream including a plurality of data segments (i.e., blocks). Unfortunately, there are a number of problems that are introduced into a backup application implementing a fixed position delta reduction backup method when data is retrieved from a system providing a backup data stream including a plurality of data blocks, where each of the data blocks has an associated set of validation bytes.

In order to illustrate the effectiveness of a fixed position delta reduction backup application for a system implementing a backup data stream including a plurality of data blocks, each having an associated set of validation bytes, the operation of the fixed position delta reduction backup application will be described with reference to FIGS. 1-2. FIG. 1 is a diagram illustrating an exemplary data stream including a plurality of blocks of data. As shown in FIG. 1, backup data is typically sent to the backup application as a data stream. In this example, a database or Application Programming Interface (API) 102 transmits the data stream 104 to a fixed position delta reduction backup application 105 for storing to a storage medium 106. As shown, the data stream 104 includes data blocks 1, 2, and 3, where each of the data blocks has an associated set of validation bytes.

When a data stream is received via an application implemented by an IBM iSeries™ platform, the data stream includes a set of validation bytes for each block of data. More particularly, the set of validation bytes includes a Cyclic Redundancy Check (CRC) value. Since each set of validation bytes generated by an IBM iSeries™ platform also includes an "unknown seeding" component, the set of validation bytes associated with each data block will change with each request to the API. As a result, the validation bytes will appear to be changed data to the fixed position delta reduction backup application, regardless of whether the corresponding data block has been modified.

As shown in FIG. 2, each set of validation bytes 107 in the data stream 104 includes an "unknown seed" component. More particularly, the set of validation bytes 107 for the data blocks 1, 2, and 3 of the data stream 104 includes a CRC that is calculated using an "unknown seed," seed1, that changes from one data backup to the next data backup. When a second request is submitted to the API, a second data stream 110 is received, which again includes a set of validation bytes 108 for each of data blocks 1, 2 and 3. Each set of validation bytes 108 in the second data stream 110 includes a CRC that is calculated using an unknown seed, seed2, that changes from one data backup to the next data backup. Thus, the CRC and therefore the set of validation bytes associated with a particular data block will differ from one backup session to the next, regardless of whether the contents of the data block have changed. As a result, when the set of validation bytes associated with each data block in the modified data stream 110 is compared to the corresponding set of validation bytes of the original data stream 104 (represented by corresponding arrows), the sets of validation bytes appear to have been modified or to be new data. As set forth above, the fixed position delta reduction backup application monitors segments of data for changes. Since each segment of the data stream being backed up typically includes both a data block and a set of validation bytes (and possibly other data block(s) and associated set(s) of validation bytes), the detection in the change of a set of validation bytes typically requires that the data blocks in that segment also be stored.

In this example, the set of validation bytes 108 associated with blocks 1, 2, and 3 of the modified data stream 110 are compared to the corresponding set of validation bytes 107 associated with data blocks 1, 2, and 3 in the original data stream 104, respectively. Since the unknown seed component used to generate the CRC of each set of validation bytes 107 of the data stream 104 differs from that of each set of validation bytes 108 of the data stream 110, the sets of validation bytes appear to have changed. The sets of validation bytes therefore appear to the backup application to be modified data, resulting in the storing of the segment(s) of the data stream including the validation bytes 108 and the corresponding data blocks 1, 2, and 3. Thus, for data streams including a set of validation bytes associated with each of a plurality of data blocks, each of the data blocks may be perceived as new (or modified) data upon a determination that the associated set of validation bytes in the same segment of the data stream has "changed." As a result, the detection of this "new data" requires that all of the "new data" be written to a local storage medium or transmitted via a network interface for storing to a remote storage medium in order to perform a complete backup. Accordingly, this "new data" is stored unnecessarily, resulting in an inefficient processing of backup data provided to the fixed position delta reduction backup application.

The inefficiencies introduced into the fixed position delta reduction backup process for systems implementing a backup data stream including a set of validation bytes associated with each data block may go unnoticed for a single file that has been edited, resulting in the storing or re-transmission of a larger portion of the file than necessary. However, for a database application backing up a large number of files in the database, the amount of data that is stored or re-transmitted by a fixed position delta reduction backup application could be significant. As a result, these undesirable characteristics could have a significant impact on the time in which a fixed position delta reduction backup application completes for a single data backup session in a system implementing data transmitted in the form of a stream including a plurality of data blocks, each having an associated set of validation bytes. Since many common database programs such as that implemented on an IBM iSeries™ provide data during data backup in the form of a stream including a set of validation bytes for each data block where the set of validation bytes changes with each data backup, this is particularly problematic.

A number of fixed position delta reduction methods have been developed for use in backup applications. Those fixed position delta reduction methods that have been developed for use with systems implementing fixed length data blocks include those described in U.S. Pat. No. 5,990,810, entitled "Method for partitioning a block of data into subblocks and for storing and communicating such subblocks," issued Nov. 23, 1999 to Ross Williams and in U.S. Pat. No. 5,745,906, entitled "Method and apparatus for merging delta streams to reconstruct a computer file," issued Apr. 28, 1998 to Mark Squibb, both of which are incorporated herein by reference. However, none of the existing methods are effective in reducing the inefficiencies resulting from the characteristics set forth above.

In view of the above, it would be beneficial if the inefficiencies introduced into a fixed position delta reduction backup process as a result of the generation of a backup data stream including a set of validation bytes for each data block could be eliminated.

SUMMARY OF THE INVENTION

Methods and apparatus for modifying a data stream of backup data to be provided to a fixed position delta reduction backup method are disclosed. This is accomplished, in part, by modifying a stream of backup data prior to processing the backup data stream via a fixed position delta reduction backup method. By modifying the stream of backup data, the amount of data that is detected by the fixed position delta reduction backup method as new or changed is minimized. Accordingly, the amount of data that is stored by the fixed position delta reduction backup method to complete a data backup is substantially reduced.

In the following description, the disclosed embodiments are described with reference to a fixed position delta reduction backup application. More specifically, a backup data stream is modified prior to providing one or more modified backup data streams to the fixed position delta reduction backup application. However, it is important to note that the disclosed embodiments may also be implemented by the fixed position delta reduction backup application. In other words, since the disclosed embodiments and the fixed position delta reduction backup process may be implemented by a single application, the modified data stream may be processed by the corresponding fixed position delta reduction backup method without requiring that the modified data stream(s) be provided to a separate application.

In accordance with one aspect of the invention, a data stream including a set of validation bytes for each data block is received. When the data stream is received, at least a portion of the data stream is parsed into a plurality of data blocks and a plurality of sets of validation bytes, wherein each of the plurality of data blocks corresponds to one of the plurality of sets of validation bytes and each of the plurality of sets of validation bytes includes a signature. A signature may be calculated, for example, by calculating a cyclic redundancy check (CRC) or checksum. One or more modified data streams are then generated such that the plurality of data blocks are separate from the plurality of sets of validation bytes. As a result, the data change detected by a fixed position delta reduction backup application is reduced, resulting in a reduction in the amount of data that is stored by the fixed position delta reduction backup application to complete a data backup.

In accordance with one embodiment, a single modified data stream is generated such that the plurality of sets of validation bytes are appended to the plurality of data blocks in a contiguous manner. In another embodiment, two different modified data streams are generated, where the first modified data stream includes the plurality of data blocks and the second modified data stream includes the plurality of sets of validation bytes.

In accordance with another embodiment, the set of validation bytes associated with each data block changes from one data backup to the next data backup. In other words, the set of validation bytes is not entirely based upon the contents of the corresponding data block. For instance, each set of validation bytes may include a signature calculated using a seed component that changes from one backup session to the next. A seed may include, for example, a date and/or time component. Alternatively, each set of validation bytes may include a value that is transmitted separately from the signature, where the value changes from one backup session to the next. For instance, such a value may include a date and/or time component.

In accordance with yet another embodiment, each set of validation bytes is a fixed length. Similarly, each of the data blocks is a fixed length data block. In other words, the length of a fixed length data block is a specific, predetermined length. The length may be fixed with respect to position (e.g., with respect to other data blocks), as well as with respect to time. Stated another way, the length is fixed with respect to position when each of the fixed length data blocks includes a predetermined, identical number of bytes of data. The length is fixed with respect to time when the length of a data block remains the same across time, and therefore across multiple data backups.

As set forth above, each data block is described as being a fixed length with respect to position, as well as with respect to time across multiple backups. However, it is important to note that the data blocks may be fixed length only with respect to position or with respect to time. Moreover, the data blocks may also be of variable length with respect to position and/or with respect to time.

In accordance with yet another embodiment, the disclosed embodiments are applied to an IBM Series™ platform. Each set of validation bytes is 16 bytes and each data block is 64 kilobytes. When backup data is requested, a request is sent via an Application Programming Interface (API). The data stream includes separate 1 megabyte portions (i.e., buffers). Each 1 megabyte portion includes individual data blocks, each followed by a validation segment (i.e., set of validation bytes). Each validation segment includes a signature. The signature may be calculated using a seed component or, alternatively, the validation segment may further include a separate value, where the seed component/value changes from one backup session to the next.

In accordance with another aspect of the invention, the invention pertains to a system operable to perform and/or initiate any of the disclosed methods. The system includes one or more processors and one or more memories. At least one of the memories and processors are adapted to provide at least some of the above described method operations. In yet a further embodiment, the invention pertains to a computer program product for performing the disclosed methods. The computer program product has at least one tangible computer readable medium and computer program instructions associated with at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Figure 1:
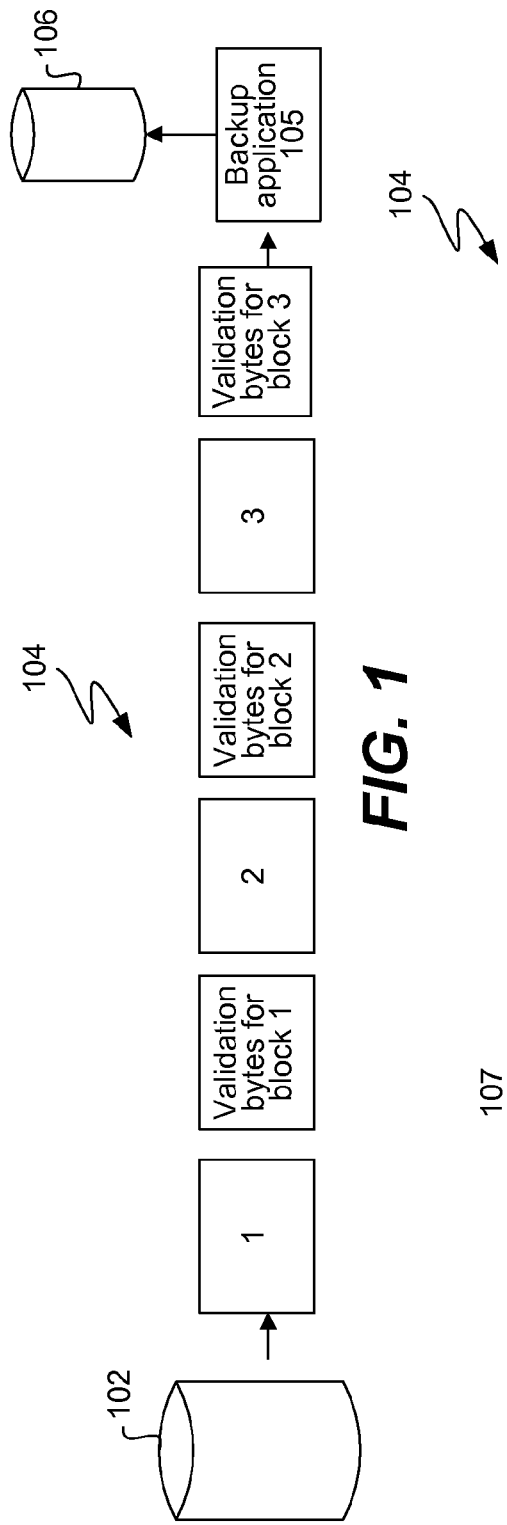
FIG. 1 is a diagram illustrating an exemplary data stream including a plurality of data blocks as processed by a typical backup application.
Figure 2:
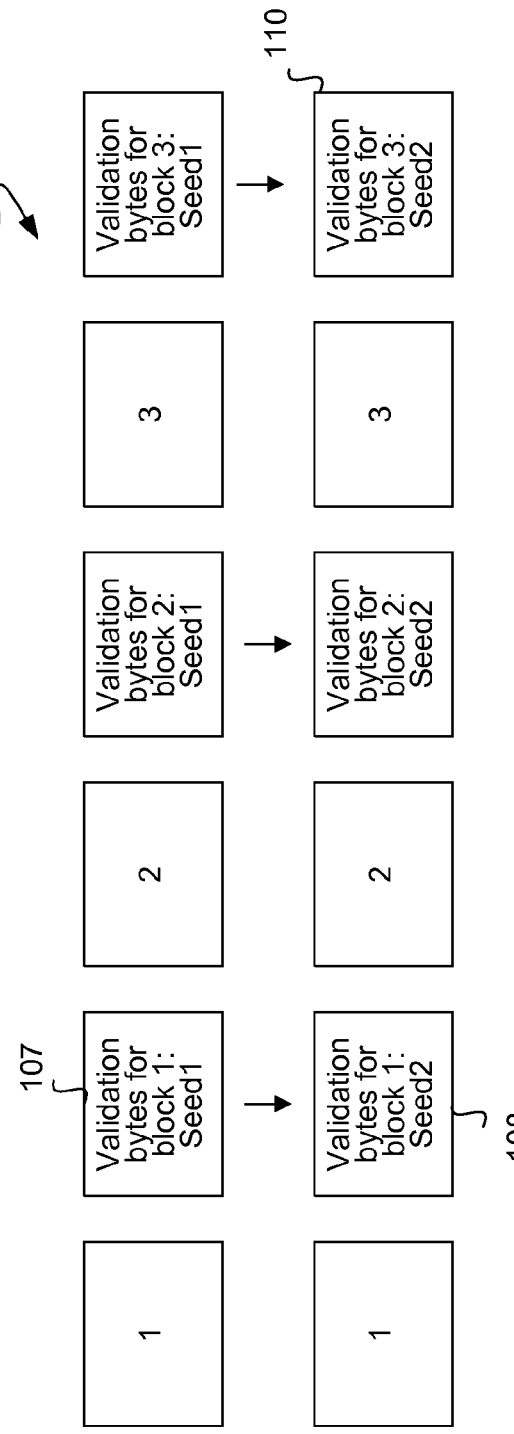
FIG. 2 is a diagram illustrating the result of generating a set of validation bytes for each data block into a data stream including a plurality of data blocks as shown in FIG. 1.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments enable a backup data stream that is received from a system generating a set of validation bytes (i.e., validation segment) for each data block, where the set of validation bytes changes with each data backup, to be efficiently processed by a fixed position delta reduction backup method. This is accomplished, in part, by modifying the backup data stream prior to passing it to the fixed position delta reduction backup method. By modifying the backup data stream, the amount of data that is perceived by the fixed position delta reduction backup method to be new or changed is minimized. In this manner, inefficiencies typically introduced into the fixed position delta reduction backup process when a backup data stream includes sets of validation bytes that vary with each backup are eliminated.

As set forth above, the set of validation bytes associated with each data block changes with each backup execution. More particularly, each set of validation bytes includes a component that changes from one backup to the next. For instance, each set of validation bytes may include a signature that is calculated using a seed component that changes from one data backup to the next data backup. For instance, the seed component may include a date and/or time. A signature may be generated, for example, by calculating a cyclic redundancy check (CRC) or checksum. Alternatively, each set of validation bytes may include a value that is transmitted separately from the signature, where the value changes from one data backup to the next data backup. For example, such a value may include a date and/or time component.

In accordance with one embodiment, the backup data stream is modified such that the data blocks are separated from the corresponding sets of validation bytes. More particularly, at least a portion of the data stream is parsed into a plurality of data blocks and a plurality of sets of validation bytes, where each of the plurality of data blocks corresponds to one of the plurality of sets of validation bytes. One or more modified data streams are then generated such that the plurality of data blocks are separate from the plurality of sets of validation bytes. For instance, the plurality of sets of validation bytes may be appended to the plurality of data blocks such that a single modified stream is generated. As another example, two different modified data streams may be generated, where the first modified data stream includes the plurality of data blocks and the second modified data stream includes the corresponding plurality of sets of validation bytes. Thus, while all data blocks in a segment of the data stream including a set of validation bytes would, in a conventional approach, be detected as new data by a fixed position delta reduction application, by separating the sets of validation bytes from the plurality of data blocks, only the sets of validation bytes will be treated as new data by the fixed position delta reduction backup application.

Data associated with a particular file or database may be stored in variable length data blocks or fixed length data blocks. The length of a data block may vary or be fixed with respect to position (e.g., with respect to other data blocks) and/or time (e.g., over time).

A variable length data block for which the length varies with respect to time may be any length, which varies with the content of the data block. In other words, the length of a variable length data block for which the length varies over time may increase or decrease over time. When data is stored in variable length data blocks where the length varies with respect to position, each of the variable length data blocks may include any number of bytes of data. In other words, each data block may include a different number of bytes of data, and therefore the length of the data blocks need not be the same. A variable length data block for which the length varies with respect to position need not vary with respect to time, and vice versa.

The length of a fixed length data block is a specific, predetermined length. The length is fixed with respect to other data blocks when each of the fixed length data blocks includes a predetermined, identical number of bytes of data. The length is fixed with respect to time when the length of a data block remains the same across time, and therefore across multiple data backups. A fixed length data block for which the length is fixed with respect to position need not be fixed with respect to time, and vice versa. Many common database programs divide databases into fixed length data blocks, where the length is fixed with respect to both position and time.

The disclosed embodiments may be implemented with systems storing data in the form of fixed length data blocks or variable length data blocks. In systems implementing variable length data blocks, the length may vary with respect to position (e.g., with respect to other data blocks) and/or time (e.g., across multiple data backups). Moreover, the disclosed embodiments may also be implemented with systems storing data in the form of fixed length data blocks where the length is fixed with respect to only position or time.

In some embodiments, the backup data stream includes one or more segments, each of which includes a plurality of data blocks and corresponding sets of validation bytes. These segments may be separated logically, and may be referred to as logical components. Each logical component may be defined as a logically distinct segment within a file or database, such as a backed-up file within a backup dump file or a database file/tablespace within a database dump stream. One method for separating logical components in a data stream is disclosed in U.S. patent application Ser. No. 11/280,545, entitled "Methods and Apparatus for Modifying a Backup Data Stream including Logical Partitions of Data Blocks to be Provided to a Fixed Position Delta Reduction Backup Application," naming Boldt et al. as inventors, filed on Nov. 15, 2005, which is incorporated herein by reference for all purposes. Alternatively, the segments may be separated into equal length portions, as will be described in further detail below with reference to the IBM iSeries™ platform.

Regardless of the manner in which the segments of a data stream are distinguished, each of the segments includes one or more data blocks, where each of the data blocks is followed by an associated set of validation bytes. In accordance with one embodiment, the backup data stream is received from an IBM iSeries™ platform. The backup data stream is typically obtained via an Application Programming Interface (API), which is referred to as the SAV API. The portions of the data stream are typically 1 megabyte in length. Each of the data blocks in a particular portion of the data stream is 64 kilobytes in length, while each associated set of validation bytes consists of 16 bytes. Moreover, each set of validation bytes includes a value that changes from one data backup to the next or, alternatively, a signature calculated using a seed component that changes from one data backup to the next.

In accordance with one embodiment, when the sets of validation bytes obtained from a 1 megabyte portion of a data stream received from an IBM iSeries™ platform are concatenated, a segment including the sets of validation bytes is generated. The segment is then appended to the data blocks obtained from that portion of the data stream. As a result, the segment of validation bytes is 256 bytes. A number of "padding" bytes (e.g., zeros) may be used to pad the segment of validation bytes. This may be desirable, for example, in order to pad a 256 byte segment of validation bytes to generate a 32 kilobyte segment, thereby maintaining consistent 32 kilobyte boundaries.

The data that is provided to or obtained by a fixed position delta reduction backup application be obtained from a database or file. In accordance with one embodiment, a plurality of data blocks are obtained from a database and a set of validation bytes is generated for each data block. Thus, the data and corresponding sets of validation bytes may correspond to one or more files stored in a database.

Data associated with a file or database may be received by a backup application as one contiguous stream of data. For instance, as set forth above, the backup application may call an application programming interface (API) offered by a database engine to request backup data. In response, the database API will send the backup data as a stream to the requesting application.

Figure 3:
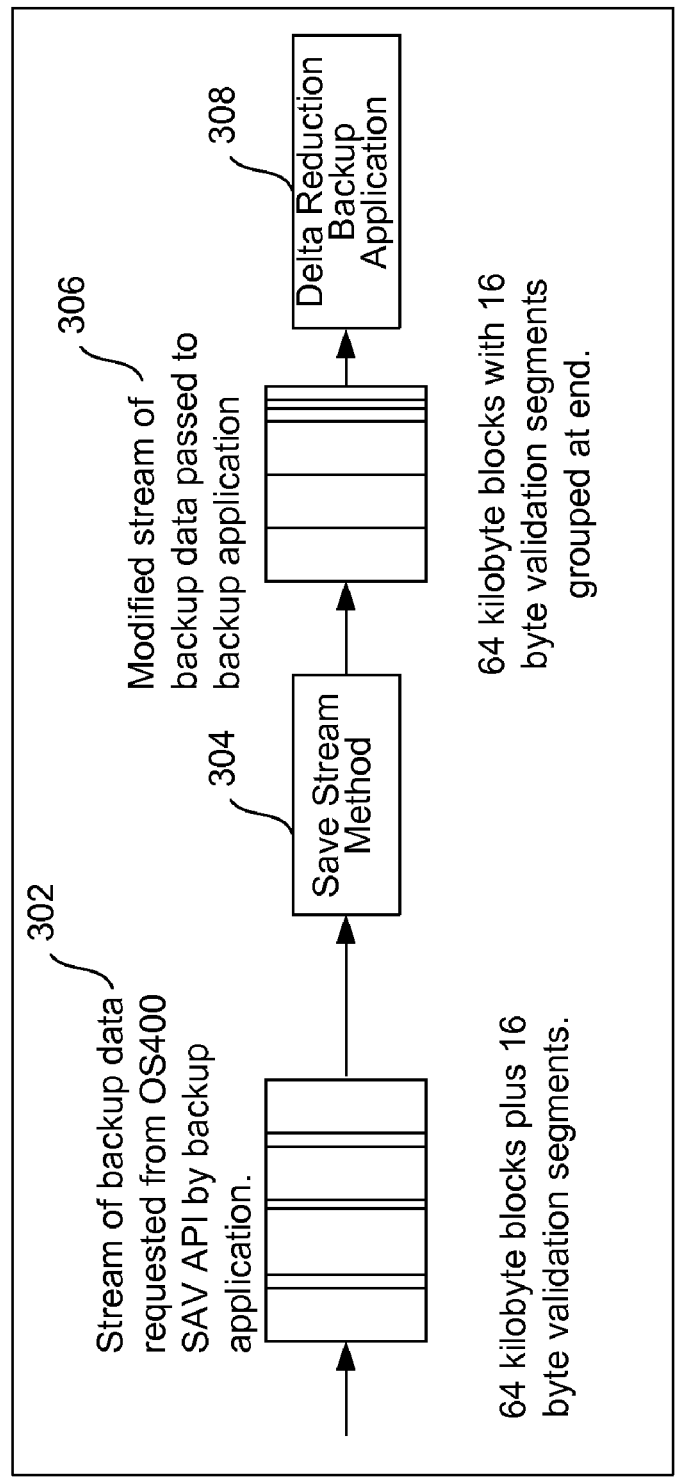
FIG. 3 is a diagram illustrating an exemplary system in which the present invention may be implemented.

FIG. 3 is a diagram illustrating an exemplary system in which the present invention may be implemented to modify a stream of backup data for transmission to a fixed position delta reduction backup application. As shown in FIG. 3, a stream of backup data 302 is received by a stream modification method (i.e., Save Stream method) 304. When the stream modification method 304 receives the stream of backup data, it modifies the stream of backup data, generating one or more modified data streams. Techniques for modifying the stream of backup data will be described in further detail below with reference to FIGS. 4-8. The modified data stream(s) 306 of backup data are then provided to a fixed position delta reduction backup application 308. Upon receipt of the modified data stream(s), the fixed position delta reduction backup application 408 processes the modified data stream(s) 306 according to standard fixed position delta reduction backup methods. It is important to note that in this example, the stream modification method 304 is performed separately from the fixed position delta reduction backup application 308. However, the stream modification method 304 and a fixed position delta reduction method may also be performed by a single application. Thus, a single application may implement any of the disclosed embodiments, as well as a fixed position delta reduction method and associated backup processes.

Each object, file or database, and therefore each stream of backup data 302 associated with a file or database, includes one or more segments (i.e., partitions). As set forth above, each of the segments may be a logical component or a fixed length segment. In accordance with one embodiment, the length of each of the partitions and each of the data blocks is a fixed length. However, it is important to note that in other embodiments, the length of each of the partitions and each of the data blocks may vary with respect to one another.

Figure 4:
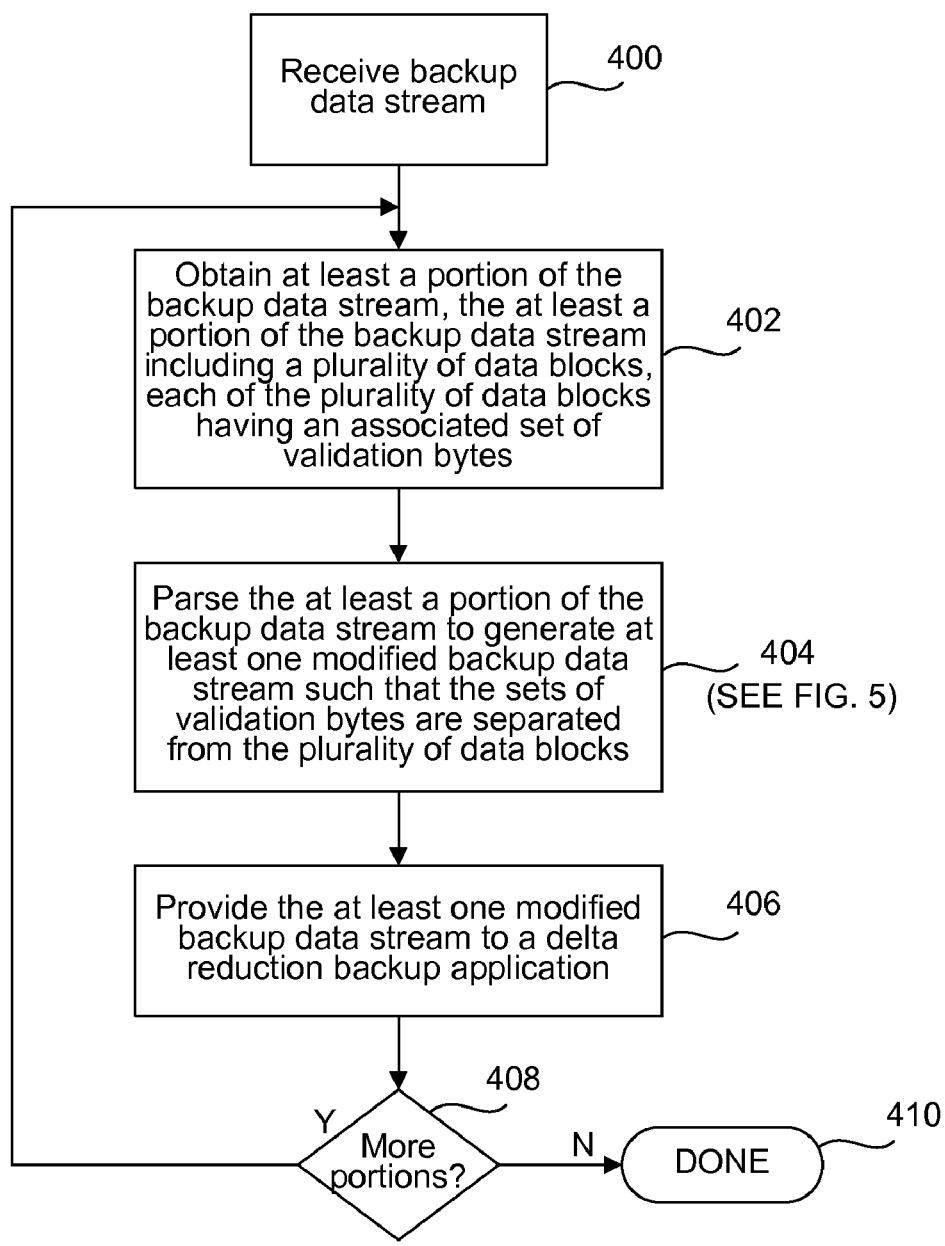
FIG. 4 is a process flow diagram illustrating a method of implementing a stream modification method as shown at block 304 of FIG. 3 in accordance with one embodiment of the invention.

FIG. 4 is a process flow diagram illustrating a method of implementing a stream modification method as shown at block 304 of FIG. 3 in accordance with one embodiment of the invention. When an incoming data stream is received at 402, at least a portion of the data stream is obtained at 404, which includes a plurality of data blocks and corresponding plurality of sets of validation bytes. For instance, where a portion of the data stream is a fixed length portion, the specified length portion is obtained. As another example, where a portion of the data stream is variable in length, such as where the portion is a logical segment of the data stream, the logical segment may be identified. Each of the plurality of data blocks corresponds to one of the plurality of sets of validation bytes. Moreover, each of the plurality of data blocks is followed by one of the plurality of sets of validation bytes. Stated another way, each pair of data blocks is separated by a set of validation bytes such that the data blocks and sets of validation bytes are alternating.

The at least a portion of the data stream is then parsed to generate one or more modified data streams such that the sets of validation bytes are separated from the plurality of data blocks at 404. For instance, each of the sets of validation bytes may be removed from the portion of the data stream, leaving only the data blocks. As another example, each of the data blocks may be removed from the portion of the data stream, resulting in a contiguous stream including the sets of validation bytes. One method of parsing a data stream (or portion thereof) such that the plurality of sets of validation bytes are separated from the plurality of data blocks will be described in further detail below with reference to FIG. 5. The one or more modified data streams may then be provided (e.g., transmitted to) a fixed position delta reduction backup application at 406.

Where the entire data stream is parsed to generate a single set of modified data streams, there are no remaining portions at 408 and the process ends at 410. Alternatively, it may be desirable to generate a different set of modified data streams for each portion of the data stream. Thus, as shown at 408, steps 402-406 may be repeated for any remaining portions of the data stream.

When the fixed position delta reduction backup application receives a modified data stream, the fixed position delta reduction backup application determines which data blocks to store to remote or local storage. For instance, the fixed position delta reduction backup application may determine which data blocks have been modified (e.g., changed, added, or deleted) by calculating signatures associated with the data blocks in the current modified data stream and comparing the calculated signatures to previously stored signatures associated with a previous backup of the same file or database. The fixed position delta reduction backup application also replaces the previously stored signatures with the newly calculated signatures, enabling the fixed position delta reduction backup application to detect changes made to the file or database since the most recent backup. Accordingly, since the sets of validation bytes have been separated from the data blocks, the fixed position delta reduction backup application will be able to correctly compare signatures of each of the data blocks with those signatures that have previously been stored by the fixed position delta reduction backup application for those data blocks. Since the sets of validation bytes that are received by the delta reduction backup application will differ from those previously received by the delta reduction backup application due to the changing seed component (or value), the sets of validation bytes will be perceived as new or modified data by the delta reduction backup application and stored.

Once the fixed position delta reduction backup application determines which data has been modified since the last data backup, the fixed position delta reduction backup application stores the modified data. This data may be sent to a local data storage medium or may be sent via a network interface for transmission to a remote storage medium.

Figure 5:
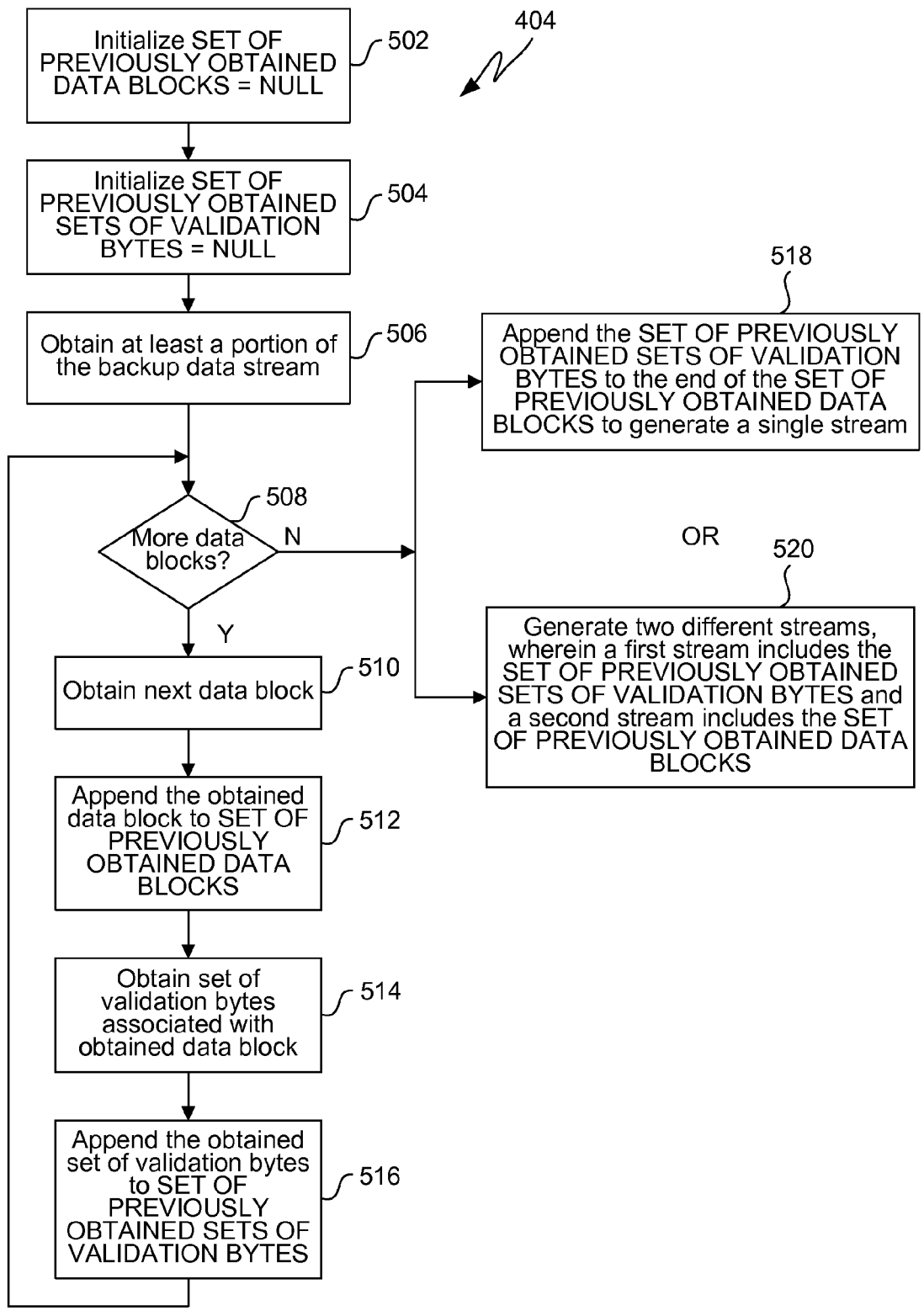
FIG. 5 is a process flow diagram illustrating a method of parsing a backup data stream as shown at block 404 of FIG. 4 in accordance with one embodiment of the invention.

As described above with reference to FIG. 4, when a backup data stream is received, it is parsed to generate one or more modified data streams. FIG. 5 is a process flow diagram illustrating an exemplary method of parsing a backup data stream as shown at block 404 of FIG. 4. In order to separate the sets of validation bytes from the data blocks as they are encountered, a string variable representing the SET OF PREVIOUSLY OBTAINED DATA BLOCKS is initialized to NULL at 502, while a string variable representing the SET OF PREVIOUSLY OBTAINED SETS OF VALIDATION BYTES is initialized to NULL at 504.

At least a portion of a backup stream is obtained at 506. If there are more data blocks at 508, the process continues at 510 to obtain the next data block. The obtained data block is then concatenated (e.g., appended) to the SET OF PREVIOUSLY OBTAINED DATA BLOCKS at 512. The set of validation bytes associated with the obtained data block is obtained at 514 and concatenated (e.g., appended) to the SET OF PREVIOUSLY OBTAINED SETS OF VALIDATION BYTES at 516. The process continues at 508 for all remaining data blocks (and corresponding sets of validation bytes) in the data stream.

As set forth above, one or more modified data streams are generated such that the plurality of data blocks are separate from the plurality of sets of validation bytes. This may be accomplished by generating a single data stream or two (or more) different data streams. More particularly, as shown at 518, the SET OF PREVIOUSLY OBTAINED SETS OF VALIDATION BYTES may be concatenated (e.g., appended) to the SETS OF PREVIOUSLY OBTAINED DATA BLOCKS to generate a single modified data stream. In other words, the sets of validation bytes may be placed at the end of the modified data stream in a contiguous manner. Alternatively, as shown at 520, two different "modified" data streams may be generated, where a first data stream includes the SETS OF PREVIOUSLY OBTAINED SETS OF VALIDATION BYTES and a second data stream includes the SETS OF PREVIOUSLY OBTAINED SETS OF DATA BLOCKS.

As described above, once a data stream has been provided to a fixed position delta reduction backup application, the data stream is processed by the fixed position delta reduction backup application and the data that has been modified since the last backup is stored by the fixed position delta reduction backup application to local or remote storage. In some instances, it is necessary or desirable to restore the backup data that has previously been stored by the fixed position delta reduction backup application. When the fixed position delta reduction backup application retrieves the stored data, it is necessary to reverse the method that was previously performed to modify the backup data stream that was provided to the fixed position delta reduction backup application.

Figure 6:
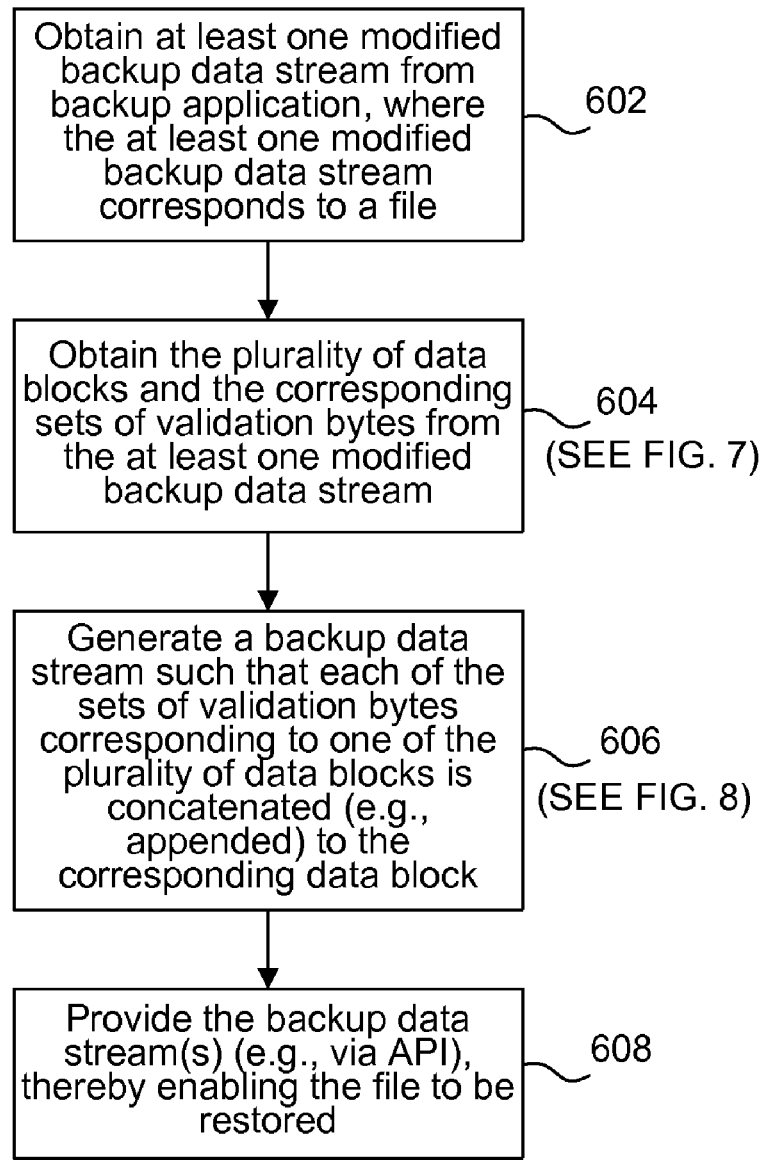
FIG. 6 is a process flow diagram illustrating a method of reversing the save method previously performed upon restore of a file in accordance with one embodiment of the invention.

FIG. 6 is a process flow diagram illustrating a method of reversing the save method previously performed upon restore of a file in accordance with one embodiment of the invention. At least one modified backup data stream is obtained from the delta reduction backup application at 602. For instance, the modified backup data stream(s) may correspond to a file. The modified backup data stream(s) are then parsed such that the plurality of data blocks and the corresponding sets of validation bytes are obtained at 604 from the modified backup data stream(s). One method of parsing the modified backup data stream(s) will be described in further detail below with reference to FIG. 7. A backup data stream is then generated (e.g., restored) at 606 such that each of the sets of validation bytes corresponding to one of the plurality of data blocks is individually concatenated (e.g., appended) to the corresponding data block. Stated another way, the data blocks and sets of validation bytes are alternating such that each pair of data blocks is separated by a set of validation bytes. One method of generating (e.g., restoring) a backup data stream will be described in further detail below with reference to FIG. 8. The backup data stream(s) are then provided (e.g., via API) at 608, thereby enabling the file to be restored. In this manner, a physical file may be restored from the backup data that has been modified as set forth above.

Figure 7:
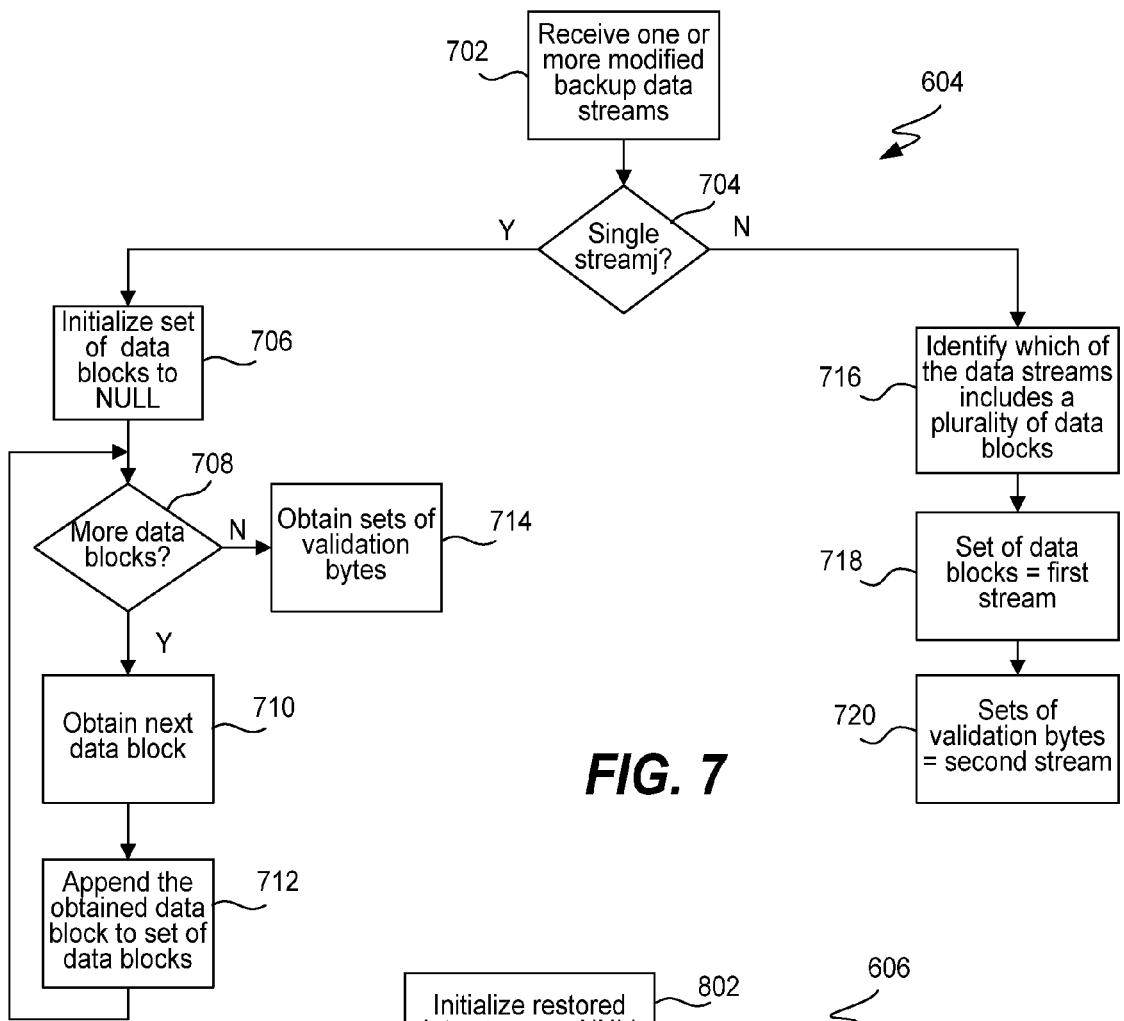
FIG. 7 is a process flow diagram illustrating a method of obtaining the data blocks and corresponding sets of validation bytes from the modified backup data stream(s) as shown at block 604 of FIG. 6 in accordance with one embodiment of the invention.

FIG. 7 is a process flow diagram illustrating a method of obtaining the data blocks and corresponding sets of validation bytes from the modified backup data stream(s) as shown at block 604 of FIG. 6 in accordance with one embodiment of the invention. One or more modified data streams are obtained (e.g., received) at 702. As set forth above, in accordance with one embodiment, a single modified data stream in which the sets of validation bytes have been appended to the data blocks is obtained. In accordance with another embodiment, two modified data streams are obtained, where a first one of the modified data streams includes the data blocks while a second one of the modified data streams includes the sets of validation bytes.

At 704, if a single modified data stream has been generated, the sets of validation bytes are separated from the sets of data blocks in the modified data stream. More particularly, the set of data blocks is initialized to NULL at 706. If there are more data blocks at 708, the next data block is obtained at 710 and appended to the set of data blocks at 712. The process repeats at 708 until all of the data blocks have been encountered. The sets of validation bytes that were previously appended to the set of data blocks may then be obtained at 714 from the modified data stream.

At 704, if two different modified data streams have been generated, one of the modified data streams includes the data blocks, while the other of the modified data streams includes the sets of validation bytes. Thus, the data stream that includes the data blocks is identified at 716. Therefore, the set of data blocks may be obtained from this first modified data stream at 718, while the sets of validation bytes may be found in the second modified data stream at 720.

Once the data blocks and sets of validation bytes have been identified, the original backup data stream may be restored. This may be accomplished by reversing the changes that were initially made to modify the backup data stream. Once the original backup data stream is restored, it may be provided via an API to the system that originated the backup data stream, enabling a file or portion thereof corresponding to the backup data stream to be restored.

Figure 8:
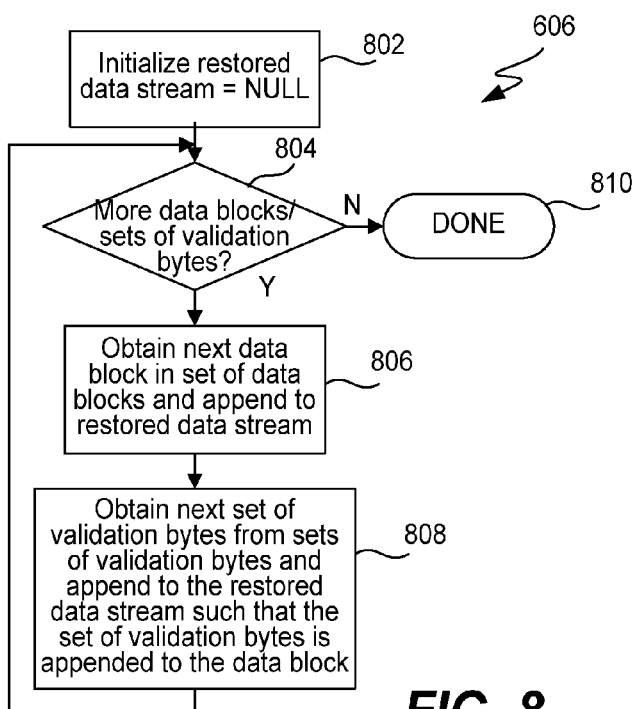
FIG. 8 is a process flow diagram illustrating a method of generating a backup data stream from the obtained data blocks and corresponding sets of validation bytes as shown at block 606 of FIG. 6 in accordance with one embodiment of the invention.

FIG. 8 is a process flow diagram illustrating a method of generating a backup data stream from the obtained data blocks and corresponding sets of validation bytes as shown at block 606 of FIG. 6 in accordance with one embodiment of the invention. The restored data stream is initialized to NULL at 802. If there are more data blocks (and associated sets of validation bytes) at 804, the process continues to obtain the next data block in the set of data blocks, which is appended to the restored data stream at 806. In addition, the next set of validation bytes is obtained from the sets of validation bytes and appended to the restored data stream at 808. In other words, the set of validation bytes is appended to the corresponding data block. In this manner, a set of validation byes may be inserted between two data blocks. The process repeats at 804 for all remaining data blocks/sets of validation bytes. When no data blocks/sets of validation bytes remain, the process ends at 810.

As described above with reference to FIGS. 6-8, a backup data stream may be restored. However, it may also be desirable to restore a portion of the original backup data stream, which may be transmitted separately to the originator of the original backup data stream or may be concatenated to other restored portions of the data stream prior to being transmitted to the originator of the original backup data stream. This may be accomplished, for example, where a set of modified data streams (e.g., a single or two different modified data streams) are generated for each portion of the original backup data stream. The set of modified data streams may therefore each be processed to separate the sets of validation bytes from the data blocks as set forth above with reference to FIG. 7. The sets of validation bytes and the data blocks for each portion of the original backup data stream may be combined for all portions or maintained separately for each portion. The original backup data stream may then be generated (e.g., restored) as set forth above with reference to FIG. 8 from the data blocks and corresponding sets of validation bytes. For instance, if the sets of validation bytes and the data blocks for all of the portions of the backup data stream are combined, the original backup data stream may be restored as described above with reference to FIG. 8. Alternatively, if the sets of validation bytes and the data blocks for each portion of the original backup data stream are maintained separately from those for other portions of the original backup data stream, each portion of the backup data stream may be separately restored. The restored portions may be separately transmitted or concatenated prior to transmission to restore the original backup data stream.

It is important to note that the file restore process operates to reverse the stream modification method previously performed to modify the backup data stream. Thus, the process illustrated in FIGS. 6-8 corresponds to a system in which the processes set forth above have been performed to modify a backup data stream. Thus, it is important to note that the file restore process will differ depending upon the format of the backup data stream received and the combination of steps performed to modify the backup data stream. Accordingly, the above-described embodiments are merely illustrative, and other methods of modifying a backup data stream may be performed to separate sets of validation bytes from the corresponding data blocks.

Generally, the techniques of the present invention may be implemented on software and/or hardware. In a specific embodiment of this invention, the technique of the present invention is implemented in software. Thus, the present invention relates to machine-readable media that include program instructions, state information (e.g., tables), etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in or associated with a tangible computer-readable medium in which a carrier wave travels over an appropriate medium such as airwaves, optical lines, electric lines, etc. Examples of program instructions include both machine code, such as produced by a compiler, and files containing higher level code that may be executed by a computer using an interpreter.

Figure 9:
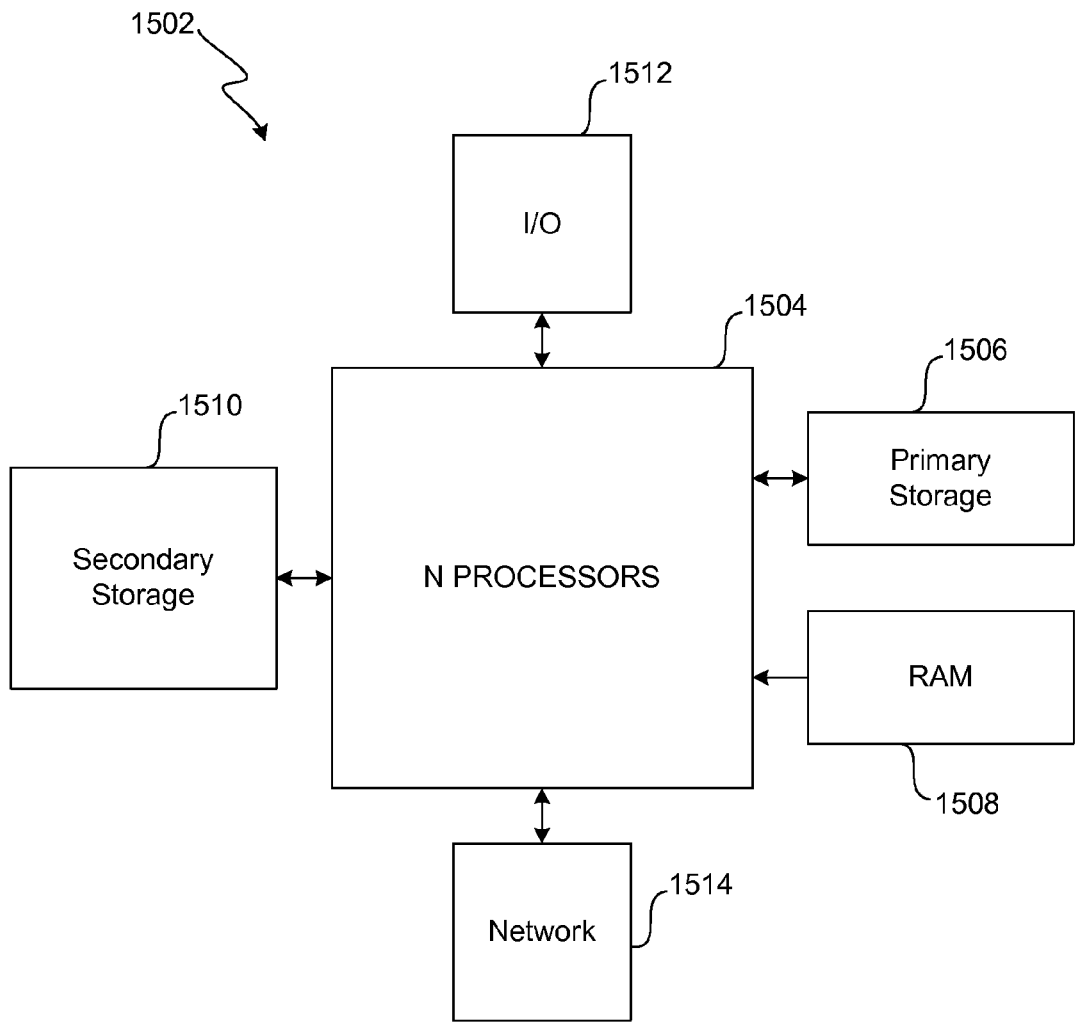
FIG. 9 is a block diagram illustrating a typical, general-purpose computer system suitable for implementing the present invention.

The present invention may be implemented on any suitable computer system. FIG. 9 illustrates a typical, general-purpose computer system 1502 suitable for implementing the present invention. The computer system may take any suitable form.

The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). As is well known in the art, ROM acts to transfer data and instructions uni-directionally to the CPUs 1504, while RAM is used typically to transfer data and instructions in a bi-directional manner. Both the primary storage devices 1506, 1508 may include any suitable computer-readable media.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk, which is generally slower than primary storage devices 1506, 1508. Alternatively, the mass memory device 1510 may be a storage device such as a SCSI storage device.

The CPUs 1504 optionally may be coupled to a computer or telecommunications network, e.g., an internet network or an intranet network, using a network connection as shown generally at 1514. With such a network connection, it is contemplated that the CPUs 1504 might receive information from the network (e.g., data associated with a restore process), or might output information to the network (e.g., data that has been processed by a fixed position delta reduction backup process or data that has been modified prior to being processed by a fixed position delta reduction backup application) in the course of performing the above-described method steps. Thus, backup data may be transmitted over a network to be processed, or to be stored to or retrieved from a remote storage device. For instance, the network may be a storage area network (SAN) such as a fibre-channel SAN. Accordingly, the invention may be installed for use across a network such as the Internet, thereby enabling data retrieval from and backup to disparate sources.

Although the foregoing invention has been described in some detail for purposes of clarity of understanding, it will be apparent that certain changes and modifications may be practiced within the scope of the appended claims. For instance, although the embodiment described refers to fixed length data blocks and partitions, the disclosed embodiments may be implemented in systems storing data in the form of variable length data blocks, where the length of the data blocks vary with respect to one another, as well as in systems in which data is stored in the form of logical segments and/or in which the length of the segments varies with respect to one another. Therefore, the described embodiments should be taken as illustrative and not restrictive, and the invention should not be limited to the details given herein but should be defined by the following claims and their full scope of equivalents.

What is claimed is:

1. A method of modifying a data stream of backup data to be provided to a fixed position delta reduction backup method, comprising:
   receiving the data stream;
   parsing at least a portion of the data stream into a plurality of data blocks and a plurality of sets of validation bytes, wherein each of the plurality of data blocks corresponds to one of the plurality of sets of validation bytes and wherein each of the plurality of sets of validation bytes includes a signature;
   generating one or more modified data streams such that the plurality of data blocks are a first set of contiguous bytes that are separate from a second set of contiguous bytes including the plurality of sets of validation bytes, wherein each of the plurality of sets of validation bytes changes from a backup session to a subsequent backup session independent of whether the contents of the corresponding one of the plurality of data blocks changes from the backup session to the subsequent backup session;
   wherein the fixed position delta reduction backup method identifies segments of the first set of contiguous bytes that have changed since a previous backup, wherein each of the segments of the first set of contiguous bytes includes a portion of the first set of contiguous bytes;
   wherein the fixed position delta reduction backup method stores segments of the first set of contiguous bytes that have changed since the previous backup but does not store segments of the first set of contiguous bytes that have not changed since the previous backup; and
   providing the one or more modified data streams to the fixed position delta reduction backup method, thereby enabling the fixed position delta reduction backup method to compare the first set of contiguous bytes against corresponding data blocks from a previous backup.

2. The method as recited in claim 1, wherein each of the plurality of sets of validation bytes further includes a component that changes from a first backup session to a second backup session.

3. The method as recited in claim 2, wherein the component is computer generated.

4. The method as recited in claim 2, wherein the component is not generated based upon the contents of the corresponding one of the plurality of data blocks.

5. The method as recited in claim 1, wherein the signature of each of the plurality of sets of validation bytes is calculated using a seeding value that changes from a first backup session to a second backup session.

6. The method as recited in claim 5, wherein the seeding value is computer generated.

7. The method as recited in claim 1, wherein each of the plurality of sets of validation bytes further includes at least one of a date or time that changes from a first backup session to a second backup session.

8. The method as recited in claim 1, wherein the data stream includes the plurality of data blocks, each of the plurality of data blocks being immediately followed by one of the plurality of sets of validation bytes.

9. The method as recited in claim 1, further comprising:
   removing each of the plurality of sets of validation bytes from the at least a portion of the data stream.

10. The method as recited in claim 1, further comprising:
    removing each of the plurality of data blocks from the at least a portion of the data stream.

11. The method as recited in claim 1, wherein generating one or more modified data streams comprises:
    generating a first modified data stream including the first set of contiguous bytes that includes the plurality of data blocks; and
    generating a second modified data stream including the second set of contiguous bytes that includes the plurality of sets of validation bytes.

12. The method as recited in claim 1, wherein generating one or more modified data streams comprises:
    appending the second set of contiguous bytes including the plurality of sets of validation bytes to the first set of contiguous bytes including the plurality of data blocks such that a single modified data stream is generated.

13. The method as recited in claim 1, further comprising:
    obtaining the one or more modified data streams;
    obtaining one of the plurality of data blocks from one of the modified data streams;
    obtaining one of the plurality of sets of validation bytes corresponding to the obtained one of the plurality of data blocks from one of the modified data streams; and
    appending the obtained one of the plurality of sets of validation bytes corresponding to the obtained one of the plurality of data blocks to the obtained one of the plurality of data blocks such that a contiguous stream is generated, thereby enabling the at least a portion of the data stream to be restored from the one or more modified data streams.

14. The method as recited in claim 13, wherein the plurality of data blocks and the plurality of sets of validation bytes are obtained from the same modified data stream.

15. The method as recited in claim 13, wherein the plurality of data blocks are obtained from a first modified data stream and the plurality of sets of validation bytes are obtained from a second modified data stream.

16. The method as recited in claim 13, further comprising: providing the contiguous stream via an API, thereby enabling the at least a portion of the data stream to be restored.

17. The method as recited in claim 1, further comprising:
obtaining the plurality of data blocks from one of the modified data streams;
obtaining one of the plurality of sets of validation bytes corresponding to the obtained one of the plurality of data blocks from one of the modified data streams; and
inserting the obtained one of the plurality of sets of validation bytes between two of the plurality of data blocks, thereby enabling the at least a portion of the data stream to be restored from the one or more modified data streams.

18. The method as recited in claim 17, wherein the plurality of data blocks and the plurality of sets of validation bytes are obtained from the same modified data stream.

19. The method as recited in claim 17, wherein the plurality of data blocks are obtained from a first modified data stream and the plurality of sets of validation bytes are obtained from a second modified data stream.

20. The method as recited in claim 17, further comprising: providing the contiguous stream via an API, thereby enabling the at least a portion of the data stream to be restored.

21. The method as recited in claim 1, wherein the signature of each of the sets of validation bytes is a CRC or checksum value.

22. The method as recited in claim 1, wherein each of the plurality of data blocks is a fixed length with respect to one another.

23. The method as recited in claim 1, wherein each of the plurality of data blocks is a variable length data block.

24. The method as recited in claim 1, wherein receiving the data stream comprises:
receiving the data stream via an API.

25. The method as recited in claim 24, wherein the API is an IBM API.

26. The method as recited in claim 1, wherein each of the plurality of data blocks consists of 64K bytes.

27. The method as recited in claim 26, wherein each of the sets of validation bytes consists of 16 bytes.

28. The method as recited in claim 1, wherein generating one or more modified data streams such that the plurality of data blocks are a first set of contiguous bytes that are separate from a second set of contiguous bytes including the plurality of sets of validation bytes comprises:
appending each of the sets of validation bytes such that a 256 byte segment includes the plurality of sets of validation bytes.

29. The method as recited in claim 28, further comprising:
padding the 256 byte segment with one or more bytes, wherein the one or more bytes do not include one or more of the plurality of data blocks.

30. The method as recited in claim 1, wherein the portion of the data stream is a 1 megabyte segment.

31. The method as recited in claim 1, further comprising:
repeating the parsing for each one of a plurality of portions of the data stream prior to generating the one or more modified data streams.

32. The method as recited in claim 1, further comprising:
repeating the parsing and the generating steps for each one of a plurality of portions of the data stream such that one or more modified data streams are generated for each of the plurality of portions.

33. The method as recited in claim 32, wherein each of the plurality of portions is a 1 megabyte segment.

34. The method as recited in claim 32, wherein each of the plurality of portions is the same length.

35. The method as recited in claim 1, wherein each of the plurality of sets of validation bytes is calculated using a component that changes from a first backup session to a second backup session.

36. The method as recited in claim 35, wherein the component is computer generated.

37. The method as recited in claim 35, wherein the component is not generated based upon the contents of the corresponding one of the plurality of data blocks.

38. The method as recited in claim 1, wherein each of the plurality of sets of validation bytes is generated using at least one of a date or time that changes from a first backup session to a second backup session.

39. The method as recited in claim 1, wherein the fixed position delta reduction backup method compares each segment of the one or more modified data streams with a corresponding segment of the one or more modified data streams of a previous backup, wherein each segment includes a portion of the first set of contiguous bytes or a portion of the second set of contiguous bytes, wherein a segment does not include both a portion of the first set of contiguous bytes and a portion of the second set of contiguous bytes.

40. The method as recited in claim 39, wherein the fixed position delta reduction backup method only stores segments of the one or more modified data streams that have changed since the previous backup.

41. The method as recited in claim 1, wherein the fixed position delta reduction backup method calculates a signature for each segment of the one or more modified data streams and compares the calculated signature with a signature for a corresponding segment of the one or more modified data streams of a previous backup.

42. The method as recited in claim 1, wherein the fixed position delta reduction backup application compares each segment of the one or more modified data streams with a corresponding segment of the one or more modified data streams of a previous backup.

43. The method as recited in claim 42, wherein the fixed position delta reduction backup application only stores segments of the one or more modified data streams that have changed since the previous backup.

44. The method as recited in claim 1, wherein the signature of each of the plurality of sets of validation bytes includes a CRC or a checksum.

45. The method as recited in claim 1, further comprising:
processing the one or more modified data streams by the fixed position delta reduction backup method, wherein processing includes comparing each segment of the first set of contiguous bytes of the one or more modified data streams with a corresponding segment of the one or more modified data streams of a previous backup, wherein the segment does not include one or more of the second set of contiguous bytes.

46. The method as recited in claim 45, wherein the fixed position delta reduction backup application only stores segments of the one or more modified data streams that have changed since the previous backup.

47. An apparatus including a processor and a memory, the apparatus being configured for modifying a data stream of backup data to be provided to a fixed position delta reduction backup method, comprising:
- means for receiving the data stream;
- means for parsing at least a portion of the data stream into a plurality of data blocks and a plurality of sets of validation bytes, wherein each of the plurality of data blocks corresponds to one of the plurality of sets of validation bytes and wherein each of the plurality of sets of validation bytes includes a signature;
- means for generating one or more modified data streams such that the plurality of data blocks are a first set of contiguous bytes that are separate from a second set of contiguous bytes including the plurality of sets of validation bytes, wherein each of the plurality of sets of validation bytes changes from a backup session to a subsequent backup session independent of whether the contents of the corresponding one of the plurality of data blocks changes from the backup session to the subsequent backup session;
- wherein the fixed position delta reduction backup method identifies segments of the first set of contiguous bytes that have changed since a previous backup, wherein each of the segments of the first set of contiguous bytes includes a different portion of the first set of contiguous bytes;
- wherein the fixed position delta reduction backup method stores segments of the first set of contiguous bytes that have changed since the previous backup but does not store segments of the first set of contiguous bytes that have not changed since the previous backup and
- providing the one or more modified data streams to the fixed position delta reduction backup method, thereby enabling the fixed position delta reduction backup method to compare the first set of contiguous bytes against corresponding data blocks from a previous backup.

48. An apparatus for modifying a data stream of backup data to be provided to a fixed position delta reduction backup method, comprising:
- a processor; and
- a memory, at least one of the processor or the memory being adapted for:
  - parsing at least a portion of a data stream into a plurality of data blocks and a plurality of sets of validation bytes, wherein each of the plurality of data blocks corresponds to one of the plurality of sets of validation bytes and wherein each of the plurality of sets of validation bytes includes a signature;
  - generating one or more modified data streams such that the plurality of data blocks are a first set of contiguous bytes that are separate from a second set of contiguous bytes including the plurality of sets of validation bytes, wherein each of the plurality of sets of validation bytes changes from a backup session to a subsequent backup session independent of whether the contents of the corresponding one of the plurality of data blocks changes from the backup session to the subsequent backup session;
  - wherein the fixed position delta reduction backup method identifies segments of the first set of contiguous bytes that have changed since a previous backup, wherein each of the segments of the first set of contiguous bytes includes one or more of the plurality of data blocks of the first set of contiguous bytes;
  - wherein the fixed position delta reduction backup method stores segments of the first set of contiguous bytes that have changed since the previous backup but does not store segments of the first set of contiguous bytes that have not changed since the previous backup; and
  - providing the one or more modified data streams to the fixed position delta reduction backup method, thereby enabling the fixed position delta reduction backup method to compare the first set of contiguous bytes against corresponding data blocks from a previous backup.

49. The apparatus as recited in claim 48, at least one of the processor or the memory being further adapted for:
- providing the one or more modified data streams to a fixed position delta reduction backup application; and
- comparing by the fixed position delta reduction backup application each segment of the one or more modified data streams with a corresponding segment of the one or more modified data streams of a previous backup, wherein each segment includes a portion of the first set of contiguous bytes or a portion of the second set of contiguous bytes, wherein a segment does not include both a portion of the first set of contiguous bytes and a portion of the second set of contiguous bytes.

50. The method as recited in claim 49, wherein the fixed position delta reduction backup application only stores segments of the one or more modified data streams that have changed since the previous backup.

51. A computer-readable storage medium storing thereon computer-readable instructions for modifying a data stream of backup data to be provided to a fixed position delta reduction backup method, comprising:
- instructions for parsing at least a portion of a data stream into a plurality of data blocks and a plurality of sets of validation bytes, wherein each of the plurality of data blocks corresponds to one of the plurality of sets of validation bytes and wherein each of the plurality of sets of validation bytes includes a signature;
- instructions for generating one or more modified data streams such that the plurality of data blocks are a first set of contiguous bytes that are separate from a second set of contiguous bytes including the plurality of sets of validation bytes, wherein each of the plurality of sets of validation bytes changes from a backup session to a subsequent backup session independent of whether the contents of the corresponding one of the plurality of data blocks changes from the backup session to the subsequent backup session;
- wherein the fixed position delta reduction backup method identifies segments of the first set of contiguous bytes that have changed since a previous backup, wherein each of the segments of the first set of contiguous bytes includes a different portion of the first set of contiguous bytes;
- wherein the fixed position delta reduction backup method stores segments of the first set of contiguous bytes that have changed since the previous backup but does not store segments of the first set of contiguous bytes that have not changed since the previous backup and
- providing the one or more modified data streams to the fixed position delta reduction backup method, thereby enabling the fixed position delta reduction backup method to compare the first set of contiguous bytes against corresponding data blocks from a previous backup.

52. A method of modifying a data stream of backup data to be provided to a fixed position delta reduction backup method, comprising:

receiving the data stream, wherein the data stream includes a plurality of data blocks and a plurality of sets of validation bytes, each of the plurality of data blocks being immediately followed by one of the plurality of sets of validation bytes, wherein each of the plurality of data blocks corresponds to one of the plurality of sets of validation bytes and wherein each of the plurality of sets of validation bytes includes a signature;

parsing at least a portion of the data stream;

generating one or more modified data streams such that the plurality of data blocks are a first set of contiguous bytes that are separate from a second set of contiguous bytes including the plurality of sets of validation bytes, wherein each of the plurality of sets of validation bytes changes from a backup session to a subsequent backup session independent of whether the contents of the corresponding one of the plurality of data blocks changes from the backup session to the subsequent backup session;

wherein the fixed position delta reduction backup method identifies segments of the first set of contiguous bytes that have changed since a previous backup without comparing the plurality of sets of validation bytes of the second set of contiguous bytes with validation bytes from the previous backup, wherein each of the segments of the first set of contiguous bytes includes a portion of the first set of contiguous bytes;

wherein the fixed position delta reduction backup method stores segments of the first set of contiguous bytes that have changed since the previous backup but does not store segments of the first set of contiguous bytes that have not changed since the previous backup; and providing the one or more modified data streams to the fixed position delta reduction backup method, thereby enabling the fixed position delta reduction backup method to compare the first set of contiguous bytes against corresponding data blocks from a previous backup.

53. The method as recited in claim 52, wherein the fixed position delta reduction backup application compares each segment of the one or more modified data streams with a corresponding segment of the one or more modified data streams of a previous backup, wherein each segment includes a portion of the first set of contiguous bytes or a portion of the second set of contiguous bytes, wherein a segment does not include both a portion of the first set of contiguous bytes and a portion of the second set of contiguous bytes.

54. A method of modifying a data stream of backup data to be provided to a fixed position delta reduction backup method, comprising:

receiving the data stream;

parsing at least a portion of the data stream into a plurality of data blocks and a plurality of sets of validation bytes, wherein each of the plurality of data blocks corresponds to one of the plurality of sets of validation bytes and wherein each of the plurality of sets of validation bytes includes a signature;

generating one or more modified data streams such that the plurality of data blocks are a first set of contiguous bytes that are separate from a second set of contiguous bytes including the plurality of sets of validation bytes;

wherein the fixed position delta reduction backup method compares each segment of the one or more modified data streams with a corresponding segment of the one or more modified data streams of a previous backup, thereby enabling the fixed position delta reduction backup method to identify segments that have changed since the previous backup;

wherein the fixed position delta reduction backup method stores the segments that have changed since the previous backup but does not store segments that have not changed since the previous backup; and providing the one or more modified data streams to the fixed position delta reduction backup method, thereby enabling the fixed position delta reduction backup method to compare the first set of contiguous bytes against corresponding data blocks from a previous backup.

55. The method as recited in claim 54, further comprising:

processing the one or more modified data streams by the fixed position delta reduction backup method.

56. The method as recited in claim 55, wherein processing the one or more modified data streams by the fixed position delta reduction backup method comprises:

comparing each segment of the first set of contiguous bytes of the one or more modified data streams with a corresponding segment of the one or more modified data streams of a previous backup, wherein the segment does not include one or more of the second set of contiguous bytes.

57. The method as recited in claim 56, further comprising:

storing the segment of the first set of contiguous bytes only if the comparing step indicates that the segment is different from the corresponding segment.

58. The method as recited in claim 54, wherein each segment that is compared includes a portion of the first set of contiguous bytes or a portion of the second set of contiguous bytes.

59. The method as recited in claim 54, wherein each segment does not include both a portion of the first set of contiguous bytes and a portion of the second set of contiguous bytes.

* * * * *